Sept. 8, 1936.   A. ROUSCH   2,053,741
HARVESTING ATTACHMENT
Filed April 10, 1936
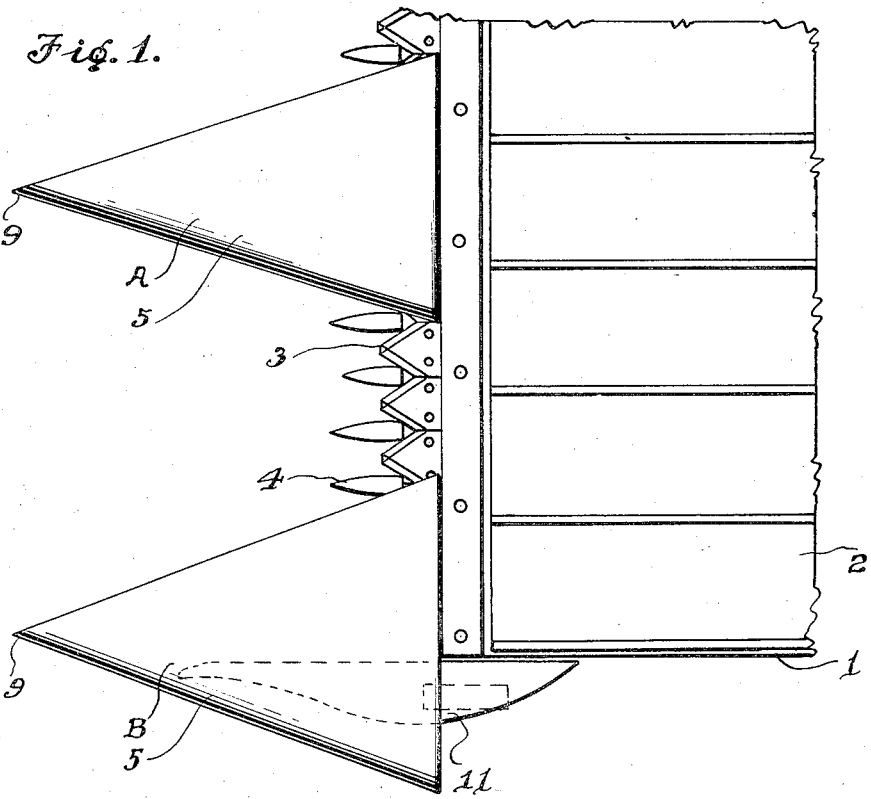
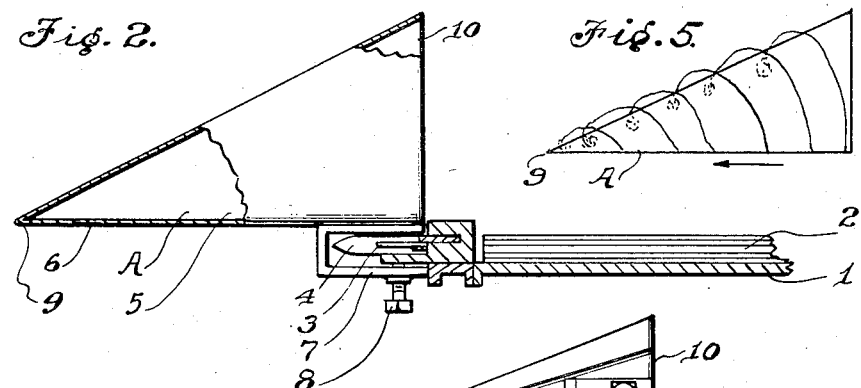
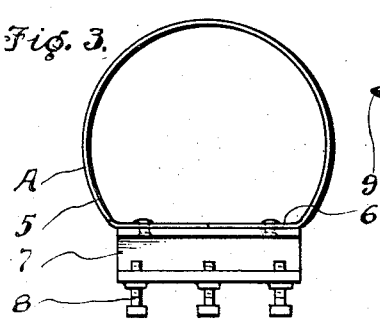
Inventor
Andrew Rousch
J. Kahlau
Attorney

UNITED STATES PATENT OFFICE 2,053,741

HARVESTING ATTACHMENT

Andrew Rousch, Fairbank, Iowa

Application April 10, 1936, Serial No. 73,752

3 Claims. (Cl. 56—312)

This invention relates to an attachment adapted to be fastened to a grain binder which provides for the successful and efficient reaping of soy beans.

The main object of the invention is to provide a pair of guides to raise the row of stalks of soy beans to an approximate upright position so they can be cut in an efficient manner without clogging the binder.

A further object of the invention is to provide two conical shaped guides extending in front of the sickle bar of a grain binder to gather and hold up the row of soy beans as they are being harvested.

A still further object of the invention is to provide a pair of conical shaped attachments to gather the stalks so as to guide them toward the cutters in order to secure a reliable and uniform operation of the cutters of grain binders.

A still further object of the invention is to provide a pair of guides in front of a grain binder to raise the stalks in case they have been bowed down by heavy rains or other influences so they can be cut as near the ground as possible.

With the foregoing and other objects in view which will appear as the description proceeds, the invention resides in the combination and arrangement of parts and in detail of construction hereinafter described and claimed, it being understood that changes in the precise embodiment of the invention herein disclosed may be made within the scope of what is claimed without departing from the spirit of the invention.

In the accompanying drawing:

Figure 1 is a top view of the platform of the binder showing the guide members attached thereto.

Figure 2 is a side view thereof with parts of the binder shown in section.

Figure 3 is an end view of one of the guide members.

Figure 4 is a bottom view thereof.

Figure 5 is a diagrammatic view showing how the guide members pick up the stalks of soy beans.

Referring now to the drawing in detail numeral 1 designates the standard binder platform having the usual carrier apron 2 and the usual reciprocating knife 3 and sickle guard 4.

The guide attachments A and B constituting this invention comprise hollow cone shaped members 5 made of sheet metal and having flattened bottoms 6 to which is attached U-shaped clamps 7 provided with bolts 8 for attaching the guides A and B to the front part of the binder as shown in Figure 2. The forward end of each guide member is pointed as at 9 while the rear end 10 is open.

In operation when it is desired to use this attachment on a binder a plurality of these attachments are placed on the binder and laterally spaced relative to one another as clearly shown in Figure 1 of the drawing. The space between the attachments is approximately equal to the width of a row of grown soy beans ready to be harvested. When so positioned the attachments will project forward in front of the binder so that the points 9 will engage and lift all the stalks including any stalks which have been beaten down and lie close to the ground. When engaged by the forward end of the attachment the stalks will be carried along by the periphery of the attachments as the binder moves forward as shown in Figure 5 and consequently the stalks of soy beans will be moved rearwardly until they may be easily cut by the reciprocating knife 3 and carried to the rear by means of the usual reel which forms a part of a standard binder.

The guide member B is somewhat larger in diameter than the guide member A in order to cover or fit over the usual grain divider 11.

These attachments form an easy and simple means for lifting the flat or partly fallen stalks and may be secured to any standard binder without altering the binder in any way.

Having described my invention, I claim:

1. In combination with a grain binder, the binder platform, the cutter bar thereof and the grain divider, a pair of guide members laterally spaced relative to each other, said guide members being conical in shape with the points facing outwardly, and means to attach said guide members to said grain binder, one of said guide members attached to the grain binder at its edge and covering said grain divider, said last mentioned guide member being larger in diameter than the other guide member.

2. In a device of the class described, a guide member made from a sheet of metal and formed in a conical shape, and a clamping member at the bottom of said guide member for attaching the device to a grain binder, said clamping member being U-shaped and provided with a set of clamping bolts.

3. In a device of the class described, a guide member made from a sheet of metal and formed in a conical shape with the bottom flattened, and a clamping member at the bottom of said guide member for attaching the device to a grain binder, said clamping member being U-shaped and provided with a set of clamping bolts.

ANDREW ROUSCH.